US006185668B1

(12) United States Patent
Arya

(10) Patent No.: US 6,185,668 B1
(45) Date of Patent: *Feb. 6, 2001

(54) METHOD AND APPARATUS FOR SPECULATIVE EXECUTION OF INSTRUCTIONS

(75) Inventor: Siamak Arya, Palo Alto, CA (US)

(73) Assignee: Intergraph Corporation, Huntsville, AL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/576,876

(22) Filed: Dec. 21, 1995

(51) Int. Cl.⁷ ....................................................... G06F 15/00
(52) U.S. Cl. ............................ 712/23; 712/218; 712/244; 712/235
(58) Field of Search .................................... 395/800, 586, 395/582, 389, 391, 393, 394, 581, 800.23, 800.21; 712/23, 239, 235, 234, 244, 213, 215, 218, 217, 24

(56) References Cited

U.S. PATENT DOCUMENTS

| 5,428,807 | * | 6/1995 | McKeen | ................................ 395/800 |
| 5,778,219 | * | 7/1998 | Amerson et al. | ..................... 395/591 |
| 5,799,179 | * | 8/1998 | Ebcioglu et al. | ..................... 395/581 |

OTHER PUBLICATIONS

Mahlke, S.A., et al., "Sentinel Scheduling for VLIW and Superscalar Processors," ASPOLS–V Conference Proceedings (Oct. 1992).

Kathail, V., et al., "HPL PlayDoh Architecture Specification: Version 1.0," Hewlett Packard Computer Systems Laboratory, HPL–93–80 (Feb. 1994); {kathail, schlansk, rau}@hplabs.hpl.hp.com.

Arya, S., et al., "An Architecture for High Instruction Level Parallelism," Proc. 28th Annual Hawaii Intl. Conf. on System Sciences (1995), Univ. of Hawaii and The IEEE Computer Soc., pp. 153–162.

* cited by examiner

Primary Examiner—Larry D. Donaghue
(74) Attorney, Agent, or Firm—Townsend and Townsend and Crew LLP

(57) ABSTRACT

An apparatus and method are described for implementing handling of exceptions caused by speculated instructions in a CPU having speculative execution capabilities. A CPU implementing speculative execution contains a speculative bit register file. Each speculative bit in the speculative bit register file is logically associated with a particular general purpose register, while remaining physically separate. This is accomplished through the use of a physically separate register file (the speculative bit register file) and register selection circuitry allowing simultaneous access to the two register files. The present invention provides instruction execution hardware supporting speculative execution with minimal impact on computational and structural complexity.

31 Claims, 4 Drawing Sheets

METHOD AND APPARATUS FOR SPECULATIVE EXECUTION OF INSTRUCTIONS

BACKGROUND OF THE INVENTION

The present invention relates generally to a method and apparatus for the speculative execution of instructions in a computer central processing unit (CPU). More specifically, the present invention provides for the management of exceptions caused by resequenced CPU instructions.

As CPU designs have developed over the years, CPU designers have added more functional units to CPU architectures. For instance, modern superscalar CPUs execute multiple integer, floating point, and memory operations in one cycle. CPU efficiency increases when the program being executed utilizes a higher percentage of these units at any one time. Many modern computing systems thus benefit from their ability to execute more than one instruction at a time. Very long instruction word (VLIW) and superscalar CPUs represent two of the more popular architectures. However, taking full advantage of the computing power they offer can prove difficult. To fully exploit the computing power available, these CPUs force the programmer to either hand-code routines, use routines hand-coded by others, or use advanced program compilers. The first two methods are labor intensive and expensive, and are therefore often impractical. The preferred method uses a compiler written to take advantage of the given CPU's capabilities. While many features and advantages are offered by VLIW and superscalar techniques, one feature employed by both is speculative execution of instructions (or simply "speculative execution").

Speculative execution is the term used to describe the execution of instructions prior to or during the evaluation of the branch controlling their execution, and is an important technique for enhancing instruction-level parallelism (the execution of more than one instruction at a time, also known as "ILP") in compiled software. In superscalar and VLIW CPUs it is advantageous to maximize CPU utilization by identifying instructions which may be grouped together and executed simultaneously on the CPU's various execution units. Furthermore, it is advantageous to resequence instructions whose execution depend on the results of a branching instruction to facilitate this grouping. This resequencing is known as "speculative code motion". "Speculative" refers to the fact that the results of the instructions executed may never be used and "code motion," to the moving of the instructions to a position before the branching instruction. The resequenced instructions (known as "speculated instructions") may be sequential with the branching instruction (termed the "fall-through stream") or may be the branching instruction's target (termed the "target stream").

Instruction-level parallelism, and CPU efficiency, may be increased by using idle execution units to execute these instruction sequences prior to and during the branch's evaluation. At a minimum, the instructions executed are those in the path most likely taken by the branch. This is determined by a prediction method which selects the instruction-stream most likely to be executed. This is known as "partial speculation," as only one of the possible instruction streams is speculatively executed. More desirable is a CPU with the ability to execute instructions in both the fall-through stream and target stream (known as "full speculation"). Given the overhead involved in evaluating a branch, speculative execution is gaining in popularity.

Speculative execution thus involves the execution of one or more instructions before the evaluation of the preceding branch has been completed. The CPU executes instructions in advance, using otherwise idle instruction processing units. If the branch is taken in the predicted direction, parallelism is increased by the early execution of the speculated instructions. If the branch is not taken in the predicted direction, the results of the speculated instructions are simply discarded. Compiler control of such speculative code motion is known as "static scheduling" because the execution order is determined by the compiler prior to program execution. This is in contrast to "dynamic scheduling" in which path prediction and execution order are determined by the processor during program execution (e.g., the prediction is made during runtime and the selected instruction stream is speculatively executed).

Some currently available compilers are capable of scheduling the simultaneous execution of instructions on various execution units within a CPU. When such a compiler is scheduling instructions, the scope of scheduling is limited to basic blocks (blocks of code containing no control flow instructions (branches)). As branches are a common feature throughout most software, the size of the basic blocks scheduled by compilers tend to be small. A typical basic block size is commonly about 5 instructions. Speculative execution addresses this constraint by permitting the compiler to position speculated instructions before their controlling branch and so promote larger basic block sizes, and thus greater ILP and computational efficiency. Using full speculation, this is achieved by speculative code motion from both the fall-through and target streams to a point above the controlling branch. Currently, no commercially available CPUs implement full speculation.

Speculative execution must not change a program's behavior. To be a viable alternative, an architecture supporting full speculation must properly handle exceptions caused by speculated instructions. If a speculated instruction's execution will cause an exception, the exception must be postponed until the time when that instruction would have originally executed. Of course, if the instruction would not have executed due to the direction taken by the preceding branch, the CPU may ignore the exception. This delayed exception processing is now explained in greater detail.

To support exception handling with speculative execution, an architecture must provide speculative bits associated with the CPU's general purpose registers. Each speculative bit is simply a one-bit field associated with each general purpose register. In order to clearly explain exception handling in CPUs supporting speculative execution, the terms "generating" and "signaling" (of an exception) must be understood. Generation is the detection and logging of an exception condition resulting from an instruction's execution. A generated exception causes an exception signal when it is known that the instruction would have executed in the original (non-speculative) code sequence. Exception signaling causes the CPU to handle an exception condition by invoking exception processing which may result in abnormal program termination, invoking an exception handler, or other special actions being taken.

Exception generation and signaling are simultaneous for instruction streams on which the compiler has performed no speculative code motion. No change occurs in the program's structure. In contrast, speculative code motion may cause the separation of exception generation and signaling of the exception. This separation is accomplished through the use of a place-holder instruction (referred to as a "check_exception instruction" or "'sentinel").

When an instruction is speculatively moved above its controlling branch, the compiler determines whether the instruction could cause an exception. If the speculated instruction's results (i.e., registers) are used only by that speculated instruction, a check_exception instruction will be placed in the speculated instruction's old position to signal any exceptions caused by the speculated instruction. If the results (registers) will be used by another speculated instruction, a single check_exception instruction may be used to signal exceptions caused by either speculated instruction.

This method may be applied recursively, so that only one check_exception instruction is needed to signal an exception by any group of speculated instructions which each use a given result (register). However, the subsequent use of that result (register) by other speculated instructions must propagate the exception condition.

This is accomplished through the use of a speculative bit, which propagates the exception condition from the instruction generating the exception to the corresponding check_exception instruction (which signals the exception condition). This allows an instruction to execute speculatively and generate but not signal an exception. The exception is signaled only if it is determined later (by a check_exception instruction) that the instruction would have also executed in the original program. The execution of a check_exception instruction signals the exception condition if a speculative bit of the instruction's results (i.e., the speculative bit associated with one of the registers used by the instruction) is set. Thus, the instruction stream's operation remains unaltered by the speculative code motion performed by the compiler. The instructions have already been executed, and now the CPU processes the exception generated by their execution.

The operation of a CPU supporting speculative execution in this manner is now described. Execution of a speculative instruction in such a system proceeds as follows. If all speculative bits associated with the instruction's source registers are cleared, then program execution proceeds normally as long as an instruction doesn't generate an exception. When an instruction does generate an exception, the speculative bit associated with the destination register is set. If the speculative bits of one or more source registers are set, then an exception propagation occurs, setting the speculative bit of the instruction's destination register. To report an exception, the program counter's value and any other required CPU state information from the time of the exception are recorded and propagated (i.e., made available to be acted upon when program execution reaches the point of the instruction signalling the exception).

Execution of a non-speculative instruction in such a system proceeds as follows. If all speculative bits associated with source registers are cleared, then the execution proceeds normally, and any exception generated by the instruction is immediately signaled. If the speculative bits associated with one or more source registers are set, that indicates a speculative instruction generated an exception. The exception is then signaled using the recorded state information. If multiple source registers have their speculative bit set, the exception corresponding to the first operand is reported.

One approach to implementing a CPU capable of handling exceptions caused by speculated instructions is to widen the CPU's internal bus and register file(s) by one bit. Unfortunately, this has an adverse impact on the CPU's architectural complexity and efficiency. Adding an extra bit gives each register an odd word-length (i.e., a word-length not equal to an even number of bytes), necessitating either bit-packing (use of a shortened, encoded version of the binary number) or wasted storage/bandwidth (using the next highest bit length, although most of the extra space is unused). This effect is propagated throughout the computer system's design for at least two reasons. During exception processing, the registers are saved, necessitating an external CPU bus of equal width (at least to the memory cache). Further, context switches (during which the currently executing process is swapped to disk) requires the ability to access permanent media in the odd (or larger) word-length. The error-correcting codes used by most systems today would also increase in complexity due to the longer word-lengths. Furthermore, the CPU's area is disproportionately increased due to the wider data and instruction busses.

Therefore, a mechanism is desirable which allows full speculation by properly handling exceptions caused by speculated instructions with minimal impact on CPU efficiency, complexity and area.

SUMMARY OF THE INVENTION

According to the present invention, an apparatus and method are described for efficiently implementing the handling of exceptions caused by speculated instructions in a CPU having speculative execution capabilities.

According to the present invention, a CPU implementing speculative execution contains a speculative bit register file. Each speculative bit in the speculative bit register file is logically associated with a particular general purpose register, while remaining physically separate. This is accomplished through the use of a physically separate register file (the speculative bit register file) and register selection logic allowing simultaneous access to the two register files (making them appear logically as a single register file). The present invention provides instruction execution hardware supporting speculative execution with minimal impact on computational and structural complexity.

According to a specific embodiment of the present invention, an apparatus for facilitating speculative execution of instructions in a data processing system includes two elements. First, such a system has a general purpose register file for storing the binary words which are the operands of the instructions executed by the CPU's execution units. Second, such a system has a register file for storing the set of speculative bits, i.e., the speculative bit register file. This second register file is physically separate from the general purpose register file, but a logical correlation exists between each speculative bit held in the speculative bit register file and its corresponding binary word (register) in the general purpose register file. Each speculative bit operates to indicate an exception caused by the execution of an instruction which employs the corresponding binary word/register as a storage destination for a result of that instruction.

A method according to the present invention speculatively executes at least one instruction in at least one of the target stream and fall-through stream following each branch instruction encountered in a software program.

The CPU executes this instruction (or instructions) during the evaluation of the branch on otherwise idle execution units within the CPU. If this instruction can cause an exception, the exception (if it occurs) is generated at instruction execution, but is indicated later. This delayed indication is accomplished by reference to a speculative bit which the CPU sets if an exception occurs during the instruction's execution. In such a situation, the speculative bit is stored in the speculative bit register file where each bit stored therein remains physically separate, but logically correlated to each register in the CPU's general purpose register file(s). Only the speculative bits corresponding to the binary word (register) used as a storage destination for a result of the instruction are affected.

A further understanding of the nature and advantages of the present invention may be realized by reference to the remaining portions of the specification and the drawings.

DESCRIPTION OF THE SPECIFIC EMBODIMENTS

The present invention solves the aforementioned problems by logically associating a speculative bit with a given general purpose register without physically associating them. The present invention stores a speculative bit separately from its associated general purpose register. The benefits of this approach are many.

First, such an approach is simpler to design and implement. Design of a CPU employing the present invention is simplified because the speculative bit hardware is physically and conceptually separate from the rest of the CPU. Support for such capabilities entails only the addition of a register file (or its equivalent) to store the speculative bits, connections to internal CPU control logic, and support via the addition of a handful of additional instructions to the CPU's control logic. This is much simpler than redesigning the CPU's data and instruction pathways.

This is especially advantageous when redesigning existing CPUs to support speculative execution. As the approach used in the present invention physically isolates the required circuitry, such functionality may be designed into existing CPU designs easily. Finally, as the compiler hides details of managing the speculative bits from the user/programmer, a CPU employing the present invention is simpler to program.

Figure 1:
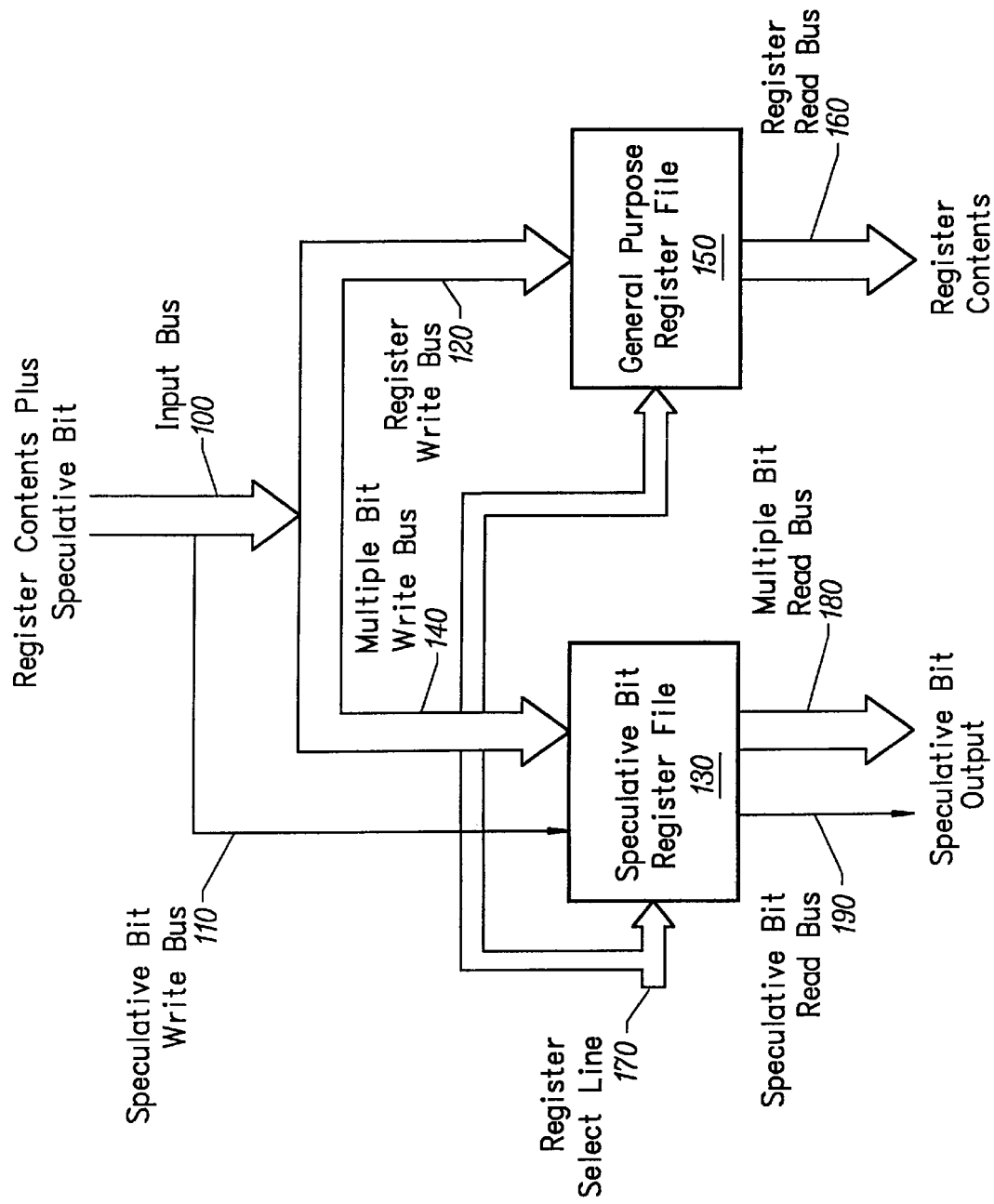
FIG. 1 is a block diagram showing a specific embodiment of the present invention.

In a specific embodiment of the invention shown in FIG. 1, a binary word and its associated speculative bit are written via an input bus 100. Input bus 100 is consists of a speculative bit write bus 110 and a register write bus 120. Register write bus 120 is also supplied to a speculative bit register file 130 by a multiple bit write bus 140. Register write bus 120 supplies a general purpose register file 150 with binary words which general register file 150 stores for future use. Binary words stored in general purpose register file 150 are read out via a register read bus 160. The binary word to be read out is selected using register select lines 170. Register select lines 170 also determine the address to which register contents are written using register write bus 120. Further, register select lines 170 select the address of a speculative bit or bits to be read or written. In general, when a value is written to general purpose register file 150 an associated speculative bit is written to a corresponding address in speculative bit register file 130. However, multiple bits may be written to or read from speculative bit register file 130 via multiple bit write bus 140 and multiple bit read bus 180, respectively. This allows speculative bits to be read from and written to speculative bit register file 130 either as single bits (using speculative bit write bus 110 and speculative bit read bus 190) or multiple bits (via multiple bit write bus 140 and multiple bit read bus 180). In this manner, speculative bit register file 130 and general purpose register file 150, while not physically attached to each other are logically related to each other.

Figure 2:
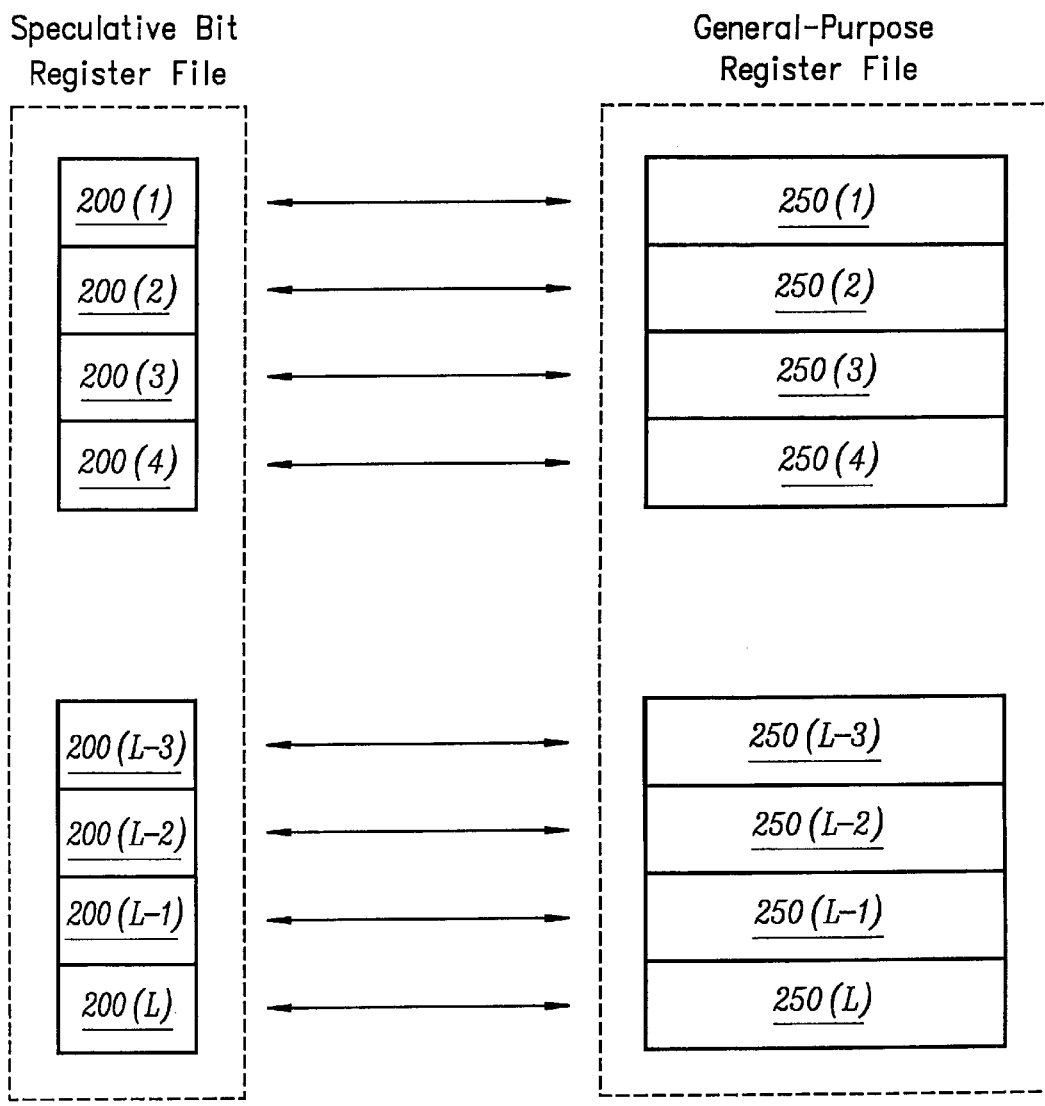
FIG. 2 is a block diagram showing the logical relationship between speculative bit register file 130 and general purpose register file 150.

FIG. 2 shows this logical correspondence between speculative bit register file 130 and general purpose register file 150. For every binary word that general purpose register file 150 is capable of storing (noted in FIG. 2 as binary word 250(1) to binary word 250(L)) there is a corresponding speculative bit in speculative bit register file 130 (noted as speculative bit 200(1) to speculative bit 200(L)). According to specific embodiment, the present invention implements the speculative bit register file as a plurality of single bit registers. According to a more specific embodiment, the single-bit register in the speculative bit register file are implemented using flip-flops collectively as a register file of single-bit registers similar to general purpose register file 150 with which these bits are logically associated. When register contents are read from general purpose register file 150, the corresponding speculative bit is loaded from speculative register file 130. In addition, when register contents are stored to general purpose register file 150, the corresponding speculative bit(s) are stored to speculative register file 130.

According to some embodiments, general purpose register file 150 refers to both integer and floating point registers. In embodiments where the integer and floating point registers are designed separately, each will have a set of speculative bits associated therewith. In embodiments where there is only a unified register file, there will only be one set of speculative bits.

Figure 3:
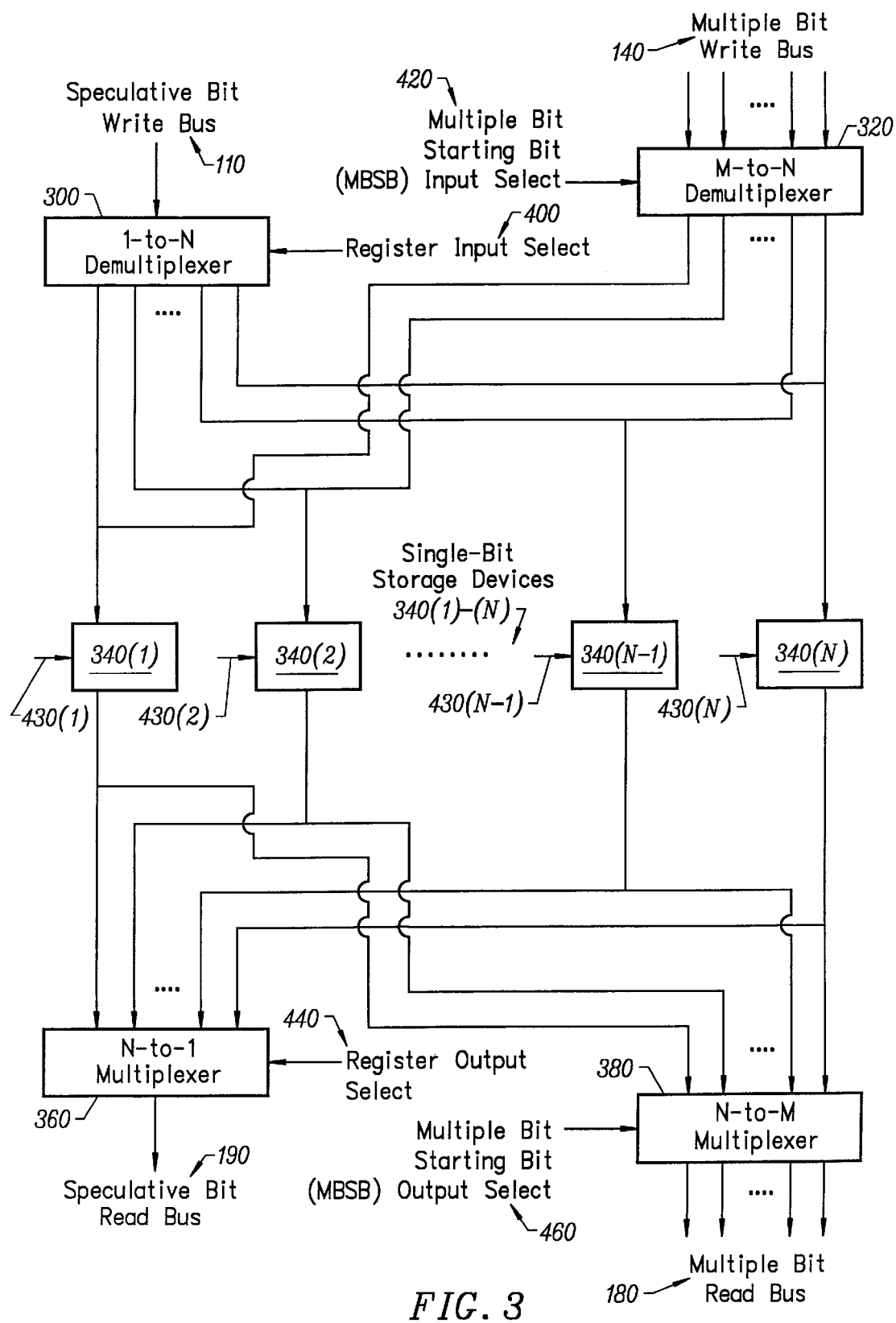
FIG. 3 is a block diagram of the internal structure of speculative bit register file 130.

A specific embodiment of a speculative bit register file 130 designed according to the present invention is shown in FIG. 3. Speculative bit register file 130 includes a 1-to-N demultiplexer 300, an M-to-N demultiplexer 320, N single-bit storage units (e.g., flip-flops) 340(1)–340(N), an N-to-1 multiplexer 360, and an N-to-M multiplexer 380. 1-to-N demultiplexer 300 is controlled by a register input select signal 400, which determines the single-bit storage unit 340 in which the single speculative bit is stored. For storing multiple speculative bits, M-to-N demultiplexer 320 is controlled by multiple bit starting bit (MBSB) input select 420. The purpose of this portion of the circuit is to allow for the storage of multiple speculative bits loaded from one of the general purpose registers. MBSB input select 420 designates the speculative bit storage unit 340 where the first of N bits are to be stored. Enable signals 430(1)–430(N) trigger storage devices 340(1)–340(N), respectively, to receive the N bits. Register output select 440 mirrors the function of register input select 400 and allows the selection of the contents of any of speculative bit storage units 340 for output from N-to-1 multiplexer 360. MBSB output select 460 selects the starting speculative bit storage unit 340 which will be used for a multiple bit read from N-to-M multiplexer 380. In this manner, multiple speculative bits may be provided to multiple bit read bus 180. Multiple-bit reads and writes are particularly useful in the case of exception processing and context switching, where the entire contents of speculative bit register file 130 must be quickly written or read.

According to one embodiment, the instruction set architecture of the present invention includes instructions to load and store any speculative bit. This facilitates the reading of individual speculative bit registers. A register that is saved or restored, has a speculative bit saved and restored with it. This is the responsibility of the compiler or the coder. The load speculative bit instruction identifies the bit number and load that bit into the least significant bit of the destination general purpose register. The store speculative bit instruction stores the least significant bit of the source general purpose register to the speculative bit location specified in the instruction. For performance reasons, the instruction set includes load and store instructions that can load and store multiple speculative bits. In specific embodiments the number of bits is equal to the size (in bits) of the general purpose registers. This helps quickly save and restore the speculative bits when necessary, such as in the case of context switch. For multiple-bit loads and stores, the instructions specify the starting speculative bit so that if the number of speculative bits is higher than the register size, more than one multiple-bit operation can be used to save and restore the speculative bits. For efficient design, some embodiments limit the speculative bit numbers in such instructions to multiples of the register size. It will be understood that it is possible to implement speculative execution without instructions to load and store multiple speculative bits without departing from the scope of the invention.

Figure 4:
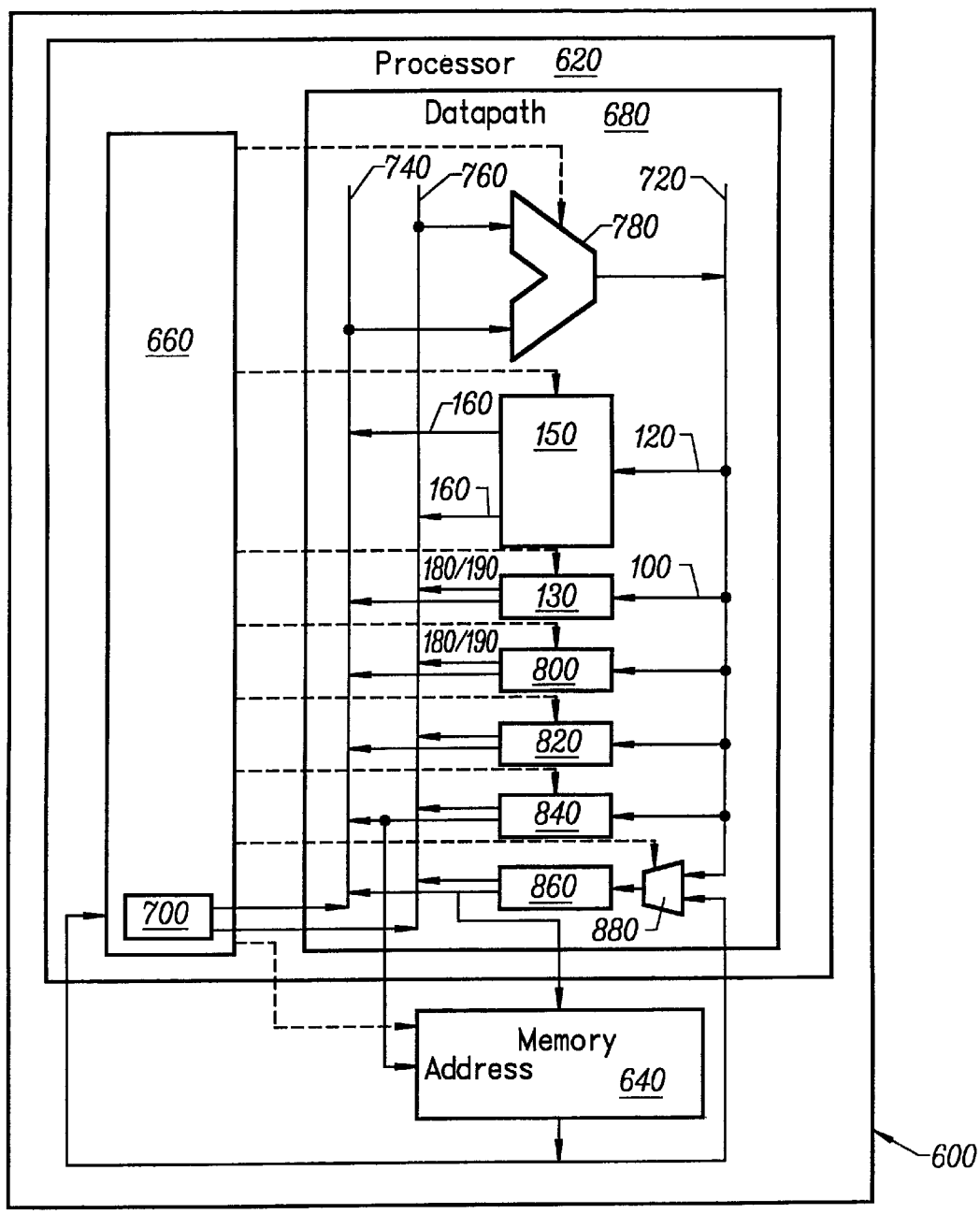
FIG. 4 is a block diagram of a data processing system which supports speculative execution according to a specific embodiment of the invention.

FIG. 4 illustrates a data processing system 600 which supports speculative processing according to a specific embodiment of the present invention. FIG. 4 also provides an illustration of how the aforementioned registers are situated within a modern processor. Data processing system 600 consists in part of a processor 620 and a memory 640. Processor 620 includes control circuitry 660 and a datapath 680. An instruction register 700 resides within control circuitry 660 and holds the instruction being decoded and executed by control circuitry 660. Datapath 680 contains speculative bit register file 130 and general purpose register file 150. Input bus 100 and speculative bit write bus 110 connect speculative bit register file 130 to destination bus 720. Multiple bit read bus 180 and speculative bit read bus 190 connect speculative bit register file 130 to source busses 740 and 760. Register write bus 120 connects general purpose register file 150 to destination bus 720. Register read bus 160 connects general purpose register file 150 to source busses 740 and 760. Also present in datapath 680 are an arithmetic-logic unit (ALU) 780, a program counter 800, an interrupt address register 820, a memory address register 840 and a memory data register 860. Input for memory data register 860 is selected by multiplexer 880. While data processing system 600 is, again, merely exemplary, it shows how processor hardware supporting speculative processing is configured.

Moreover, while the invention has been particularly shown and described with reference to specific embodiments, it will be understood by those skilled in the art that the foregoing and other changes in the form and details may be made therein without departing from the spirit or scope of the invention. For example, the present invention should not be limited by the single general purpose register file shown in the drawings. It is expected that the architecture in which the present invention is employed will have numerous such register files, with corresponding speculative bit register files. Consequently, the scope of the invention should be determined with reference to the appended claims.

What is claimed is:

1. An apparatus for facilitating speculative execution of instructions in a data processing system, comprising:
   a register file comprising a plurality of registers, each one of the plurality of registers configured to store one of a plurality of instructions;
   a plurality of single-bit storage units disposed separately from the register file;
   a multiple bit write bus coupled to the plurality of single bit storage units; and
   a multiple bit read bus coupled to the plurality of single bit storage units;
   wherein each one of the plurality of single-bit storage units corresponds to one of the plurality of registers and is configured to store one of a plurality of speculative bits,
   wherein the plurality of single-bit storage units are configured to simultaneously receive and store the plurality of speculative bits; and
   wherein each one of the plurality of speculative bits is operable to indicate an occurrence of an exception, wherein each one of the plurality of speculative bits indicates the occurrence of the exception if the execution of an instruction stored in a corresponding register generates an exception.

2. The apparatus of claim 1, further comprising:
   register selection circuitry coupled to the plurality of single bit storage units and to the register file, configured to select individual registers from the plurality of registers and individual single-bit storage units from the plurality of storage units for reading and writing operations.

3. The apparatus of claim 1, wherein the instruction is one of a set of instructions, the set of instructions comprising a target stream and a fall-through stream associated with a branch instruction, the speculative bits being operable to indicate exceptions caused by execution of instructions in at least one of the target and fall-through streams.

4. The apparatus of claim 1, wherein the instruction is one of a set of instructions, the set of instructions comprising a target stream and a fall-through stream associated with a branch instruction, the speculative bits being operable to indicate exceptions caused by execution of instructions in both of the target and fall-through streams.

5. The apparatus of claim 2, wherein the register selection circuitry comprises:
   input selection circuitry, coupled to the plurality of single-bit storage units, configured to select to which individual single-bit storage units speculative bits are written, and
   output selection circuitry, coupled to the plurality of single-bit storage units, configured to select from which individual single-bit storage units speculative bits are read.

6. The apparatus of claim 5, wherein each one of the plurality of single-bit storage units comprises a flip-flop.

7. The apparatus of claim 5, wherein the plurality of single-bit storage units comprises a register, the register selection circuitry being capable of individually reading and writing each one of the plurality of speculative bits from and to said register. respectively.

8. The apparatus of claim 7, wherein the input selection circuitry comprises a 1-to-N demultiplexer.

9. The apparatus of claim 7, wherein the output selection circuitry comprises an N-to-1 multiplexer.

10. The apparatus of claim 7, further comprising:
    multiple-bit input selection circuitry, coupled to the plurality of single-bit storage units and to the multiple bit write bus, configured to select a first group of single-bit storage units from the plurality of single-bit storage units to which speculative bits are written; and
    multiple-bit output selection circuitry, coupled to the plurality of single-bit storage units and to the multiple bit read bus, configured to select a second group of single-bit storage units from the plurality of single-bit storage units from which speculative bits are read.

11. The apparatus of claim 10, wherein the multiple-bit input selection circuitry comprises an M-to-N demultiplexer.

12. The apparatus of claim 10, wherein the multiple-bit output selection circuitry comprises an N-to-M multiplexer.

13. The apparatus of claim 1, further comprising:
register selection circuitry configured to select specific ones of the first registers and the plurality of single-bit storage units for reading and writing operations.

14. The apparatus of claim 2, wherein the register selection circuitry comprises
input selection circuitry, coupled to the plurality of single-bit storage units, configured to select to which single-bit storage unit one of the plurality of speculative bits is written, and
output selection circuitry, coupled to the plurality of single-bit storage units, configured to select from which single-bit storage unit one of the plurality of speculative bits is read.

15. The apparatus of claim 14, wherein the plurality of single-bit storage unit comprises a register, the register selection circuitry being capable of reading and writing each one of the plurality of speculative bits individually.

16. The apparatus of claim 15, further comprising:
multiple-bit input selection circuitry, coupled to the plurality of single-bit storage units, configured to select a plurality of the plurality of single-bit storage units to which a plurality of the speculative bits is written; and
multiple-bit output selection circuitry, coupled to the plurality of single-bit storage units, configured to select a plurality of the plurality of single-bit storage units from which a plurality of the speculative bits is read.

17. An apparatus for facilitating speculative execution of instructions in a data processing system, comprising:
a register file comprising a plurality of registers, each one of the plurality of registers configured to store one of a plurality of binary words;
a plurality of single-bit storage units disposed separately from the register file;
a multiple bit write bus coupled to the plurality of single-bit storage units configured to provide speculative bit inputs for a first group of single-bit storage units from the plurality of single-bit storage units;
a multiple bit read bus coupled to the plurality of single-bit storage units configured to provide to speculative bit outputs from a second group of single-bit storage units; from the plurality of single-bit storage units;
a single bit write bus coupled to the plurality of single-bit storage units configured to provide speculative bit input for a first single-bit storage unit from the plurality of single-bit storage units;
a single bit read bus coupled to the plurality of single-bit storage units configured to provide speculative bit output from a second single-bit storage unit from the plurality of single-bit storage units;
wherein each one of the plurality of single-bit storage units corresponds to one of the plurality of registers, and is configured to store one of a plurality of speculative bits,
wherein each one of the plurality of speculative bits is operable to indicate an occurrence of an exception,
wherein a given one of the plurality of speculative bits indicates the occurrence of the exception if the execution of an instruction generates the exception; and register selection circuitry coupled to the single bit read bus, to the single bit write bus, and to the register file configured to select specific ones of the plurality of registers and corresponding ones of the plurality of single-bit storage units for reading and writing operations.

18. The apparatus of claim 17, wherein the register selection circuitry comprises:
input selection circuitry, coupled to the plurality of single-bit storage units, configured to select to which individual single-bit storage unit speculative bits is written, and
output selection circuitry, coupled to the plurality of single-bit storage units and to the single bit read bus, configured to select from which individual single-bit storage unit speculative bits is read.

19. The apparatus of claim 17, wherein each one of the plurality of single-bit storage units comprises a flip-flop.

20. The apparatus of claim 17, wherein the plurality of single-bit storage units comprise a registers, the register selection circuitry being capable of individually reading and writing each one of the plurality of speculative bits from and to said register. respectively.

21. The apparatus of claim 17, wherein the input selection circuitry comprises a 1-to-N demultiplexer.

22. The apparatus of claim 17, wherein the output selection circuitry comprises a N-to-1 multiplexer.

23. The apparatus of claim 17, further comprising:
multiple-bit input selection circuitry, coupled to the plurality of single-bit storage units and to the multiple bit write bus, configured to select a plurality of single-bit storage units to which a set of the plurality of speculative bits is written; and
multiple-bit output selection circuitry, coupled to the plurality of single-bit storage units and to the multiple bit read bus, configured to select a plurality of single-bit storage units from which a set of the plurality of speculative bits is read.

24. The apparatus of claim 23, wherein the multiple-bit input selection circuitry comprises an M-to-N demultiplexer.

25. The apparatus of claim 19, wherein the multiple-bit output selection circuitry comprises an N-to-M multiplexer.

26. A method for speculatively executing instructions in a data processing system, the data processing system including a register file comprising a plurality of registers, each one of the registers configured to store one of a plurality of binary words, the data processing system also including a plurality of single-bit storage units disposed separately from the register file, each single-bit storage unit being configured to store a speculative bit corresponding to one of the plurality of registers, the method comprising:
speculatively executing an instruction in a target stream associated with a branch instruction and an instruction in a fall-through stream associated with the branch instruction; and
for the executed instruction in the target stream and for the executed instruction in the fall-through stream, altering a speculative bit stored in a respective single-bit storage unit corresponding to the executed instructions to indicate an exception of each respective executed instruction,
wherein altering the speculated bit comprises accessing a single-bit storage unit corresponding to the executed instruction in the target stream and accessing a single bit storage unit corresponding to the executed instruction in the fall-through stream substantially simultaneously via a multiple bit write bus coupled to the plurality of single bit storage units.

27. The method of claim 26 further comprising controlling reading and writing of the speculative bits from the plurality of single-bit storage units with software.

28. The method of claim 26 further comprising reading one of the speculative bits from the plurality of single-bit storage units.

29. The method of claim 26 further comprising writing one of the speculative bits to the plurality of single-bit storage units.

30. The method of claim 26 further comprising reading a plurality of the speculative bits from the plurality of single-bit storage units substantially simultaneously via a multiple bit read bus coupled to the plurality of single bit storage units.

31. The method of claim 26 further comprising writing a plurality of the speculative bits to the plurality of single-bit storage units substantially simultaneously.

* * * * *